United States Patent [19]

Schulze et al.

[11] Patent Number: 5,184,702
[45] Date of Patent: Feb. 9, 1993

[54] HYDRAULIC DAMPER

[75] Inventors: Detlef Schulze, Backnang; Klaus Schwarz, Stuttgart, both of Fed. Rep. of Germany

[73] Assignee: Mercedes-Benz AG, Fed. Rep. of Germany

[21] Appl. No.: 618,180

[22] Filed: Nov. 21, 1990

[30] Foreign Application Priority Data

Nov. 30, 1989 [DE] Fed. Rep. of Germany ....... 3939650

[51] Int. Cl.⁵ .................................................. F16F 9/50
[52] U.S. Cl. .................................... 188/282; 188/317; 267/226; 267/219
[58] Field of Search ................ 188/322.22, 282, 317; 267/219, 124, 127, 128, 221, 226, 220

[56] References Cited

U.S. PATENT DOCUMENTS

| | | | |
|---|---|---|---|
| 1,605,798 | 11/1926 | Van Crombrugge | 267/226 |
| 1,866,167 | 7/1932 | Lolley | 267/220 |
| 2,637,788 | 5/1953 | Bracken | 188/317 |
| 2,980,441 | 4/1961 | Timpner et al. | 267/220 |
| 3,109,520 | 11/1963 | Vossieck | 188/322.22 |
| 3,260,536 | 7/1966 | Sundby | 188/317 |
| 4,113,071 | 9/1978 | Müller et al. | 267/124 |
| 4,310,077 | 1/1982 | Whiteside | 188/282 |
| 4,364,582 | 12/1982 | Takahashi et al. | 188/298 |
| 4,568,067 | 2/1986 | Iwata | 267/8 R |
| 4,830,346 | 5/1989 | Eberhard et al. | 267/219 |

FOREIGN PATENT DOCUMENTS

| | | |
|---|---|---|
| 939657 | 7/1949 | Fed. Rep. of Germany . |
| 1158379 | 11/1963 | Fed. Rep. of Germany . |
| 3808996 | 9/1989 | Fed. Rep. of Germany . |

*Primary Examiner*—Joseph F. Peters, Jr.
*Assistant Examiner*—Anne E. Bidwell
*Attorney, Agent, or Firm*—Evenson, Wands, Edwards, Lenahan & McKeown

[57] ABSTRACT

A hydraulic damper is designed, for example, as a piston/cylinder unit. The arrangement has a part (for example, a piston) forming a vibrational system by means of a spring. Vibrations acting on the damper arrangement are greatly attenuated virtually only in the resonant range of this vibrational system, because only in this case can vibrations of high amplitude be excited and a high dissipation of energy by way of hydraulic flows in channels and between cylinder chambers take place.

10 Claims, 1 Drawing Sheet

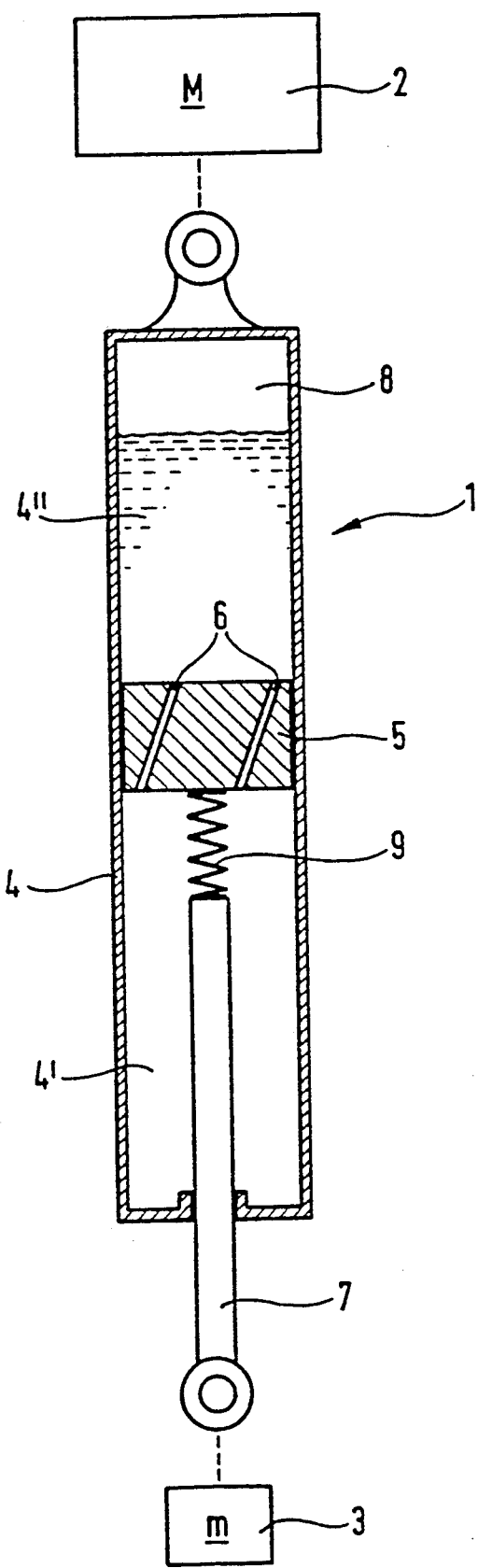

HYDRAULIC DAMPER

BACKGROUND AND SUMMARY OF THE INVENTION

The present invention relates to a hydraulic damper arrangement with a hydraulic positive-displacement unit. More particularly, the present invention is directed to a hydraulic damper in the form of a piston/cylinder unit and insertable between an element to be damped in terms of its movement and a relatively stationary element. The arrangement has in its housing two chambers which are connected to one another via at least one channel with a throttle effect and between which hydraulic medium is exchanged via the channel during the shifting of the positive-displacement means.

A damper arrangement is shown, for example, in German Patent Specification 939,657. Here, a positive-displacement means is formed by a piston which, within the cylinder, separates two chambers connected to one another via channels passing through the piston. At the same time, one group of channels interacts with plate valves arranged on the piston top side and another group of channels interacts with the plate valves arranged on the piston underside. The valve plates on the piston top side are assigned a first helical spring which is arranged between the piston top side and the upper portion of the cylinder. The valve plates on the underside are assigned a further helical spring which is inserted between the piston underside and the lower portion of the cylinder. Furthermore, the chamber arranged between the upper portion of the cylinder and the piston topside is also connected to a compensating chamber. At the same time, a flow from the one chamber into the compensating chamber has to overcome the closing pressure of a non-return valve opening in this direction, and a flow in the opposite direction from the compensating chamber into the one chamber goes via a plate valve opening in this flow direction.

The above-described arrangement of the plate valves located on the piston ensures that only a relatively low or vanishing damping resistance has to be overcome when the piston leaves the middle position in relation to the cylinder; in contrast, during the return of the piston to its middle position, a markedly increased damping resistance has to be overcome. Furthermore, the springs loading the plate valves located on the piston also exert some adjusting force which seeks to urge the piston into it middle position.

German Offenlegungsschrift 3,808,996 shows a hydraulically damping two-chamber engine bearing which is designed in the manner of a positive-displacement unit. In this, the housing possesses two chambers communicating with one another via a channel and a positive-displacement device which is arranged movably within the one chamber and which is connected elastically to the positive-displacement housing via a suspension spring. On the positive-displacement device, a canceling mass is arranged vibrationally within one chamber. Furthermore, an elastic diaphragm is arranged as a partition between the two chambers. The canceling mass reduces the dynamic rigidity of the engine bearing within a limited frequency range. An uncoupling during high-frequency vibrations can be obtained by the diaphragm between the two chambers.

In practice, there is often a need for damper arrangements having a behavior with a pronounced frequency selectivity. For example, in a steering damper, it is desirable that the damper should oppose only a slight resistance to the normal steering movements, but undesirable vibrations will be damped sharply. While steering movements take place at relatively moderate speed, the undesirable vibrations in the steering system of the vehicle are usually around approximately 10 Hz to 25 Hz. Moreover, in a steering damper, it is also desirable that high-frequency vibrations should, if possible, not be transmittable.

An object of the present invention is, therefore, to provide a hydraulic damper arrangement having a behavior with a pronounced frequency selectivity, while at the same time a good uncoupling between the inlet and outlet of the damper arrangement will be guaranteed during high-frequency vibrations.

According to the present invention, this object is achieved in that the positive-displacement device or the housing is vibrationally connected, via an elastic spring mounting arranged in series therewith, to the element to be damped. The spring constant of the spring mounting, the mass of that part (positive-displacement device or housing) of the damper arrangement connected to the spring mounting, the mass of the hydraulic medium moved during relative movements between the positive-displacement device and the housing, and the ratio between the cross-section of the positive-displacement device are calculated in such a way that the resonant frequency of vibrations of these masses in relation to the stationary part of the damper arrangement is near the frequency range of undesirable vibrations of the element to be damped. The channel or channels have a throttle resistance increasing sharply, i.e., super proportionally, with the flow velocity.

In the damper arrangement according to the present invention, therefore, movable masses are vibrationally coupled via the spring mounting t the part to be damped in terms of its movement, in such a way that the vibrational masses can be excited by the element to be damped in terms of it movement with the flow of velocity into resonant vibrations which, due to their high speed of movement, lead to high flow velocities of the hydraulic medium in the channel or channels, so that their throttle effect gives rise to a high dissipation of energy, that is to say a large amount of kinetic energy is extracted from the element to be damped in terms of its movement.

When the relative movements between the positive-displacement device and the housing are very slow, the elasticity of the spring mounting and the throttle resistance of the channel or channels can be largely ignored. In other words, the element to be damped in terms of its movement and the relatively stationary element can be moved in relation to one another virtually without any resistance.

When vibrations of very high frequency, that is to say of a frequency well above the resonant frequency, act on the damper arrangement, the stationary part of the damper arrangement, on the one hand, and the masses vibratable relative to this, on the other hand, are substantially uncoupled vibrationally from one another by means of the spring mounting, with the result that the volumetric flow of hydraulic medium passing through the channel or channels decreases sharply, the amount of energy dissipation becoming correspondingly small or approach zero. The spring mounting thus prevents high-frequency vibrations from being transmitted between the element to be damped in terms of its movement and the stationary element. The acoustic transmission of noises between the element to be damped in terms of its movement and the stationary element can as far as possible be prevented in this way. The channel or channels from a throttle arrangement which can be located, for example, in the positive-displacement means or piston.

BRIEF DESCRIPTION OF THE DRAWING

These and other objects, features and advantages of the present invention will become more readily apparent from the following detailed description of the presently preferred embodiment when taken in conjunction with the accompanying sole figure constituting an axial section through the embodiment of the damper arrangement configured as a piston/cylinder unit.

DETAILED DESCRIPTION OF THE DRAWING

The damper arrangement designated generally by the numeral 1 is arranged between a vehicle body 2 (shown diagrammatically) having a relatively large mass M and an element of the vehicle steering 3 (likewise represented diagrammatically) with a mass m small in comparison with the mass M of the body 2. The vehicle body 2 with the large mass M can be contemplated as "stationary" for further consideration, while the vehicle steering 3 with the small mass M constitutes a system or element which is movable in relation to the stationary body 2 and of which the movements relative to the vehicle body 2 are to be damped with frequency selectivity by the damper arrangement 1.

The damper arrangement 1 comprises a cylinder 4 connected to the body 2, largely immovably or essentially only in an articulated manner, and a piston 5 which is arranged shiftably in the cylinder 4 and which divides two chambers 4' and 4'', which are filled with hydraulic medium, are connected to one another via at least one channel 6 passing through the piston 5. Furthermore, a compressed-gas charge 8 is arranged in one chamber, for example in the upper chamber 4'', for compensating the hydraulic medium displaced by the piston rod 7, so that the hydraulic medium is maintained under a slight over-pressure in the chambers 4' and 4'' of the cylinder 4.

The piston 5 is connected via a helical spring 9 to the piston rod 7, the end of which projects from the cylinder 4 is connected essentially firmly or only in an articulated manner to the steering 3 or to a linkage part thereof.

Because the piston 5 is arranged on the helical spring 9, the piston 5 can execute vibrations in relation to the steering 3. At the same time, the resonant frequency is determined by the spring constant of the helical spring 9 and by the effective vibrational masses within the damper arrangement 1. These effective vibrational masses are determined essentially by the mass of the piston 5, including the mass of a piston-rod part arranged, if appropriate between the helical spring 9 and the piston 5, and by the effective mass of the hydraulic medium received in the channel 6.

The effective mass of the hydraulic medium vibrating with the piston is determined essentially by the volume of the channel 6 or, if there is a plurality of channels, of the channels 6 and by a ratio between the cross-section of the piston 5 and the cross-section of the channel or channels 6.

For the same volume of the particular channel 6, the effective mass of the hydraulic medium received in it is all the greater, the narrower the channel cross-section in comparison with the cross-section of the piston 5. This is due to the fact that, in the event of a shift of the piston 5 within the cylinder 4 at a predetermined speed, there must be flow velocities within the channel or channels 6 which are all the higher, the narrower the channel cross-section.

Moreover, for a predetermined cross-section of the piston 5 and a predetermined length of the channel 6 or channels 6, the effective mass of the hydraulic medium vibrating with the piston 5 remains substantially constant when the cross-section of the channel 6 or channels 6 is varied. This is because the flow velocity of the hydraulic medium in the channel 6 or channels 6 changes in inverse proportion to changes of the channel cross-section.

The total acting effective mass $m_w$ is proportional $m_k$ $(A_z/A_k)^2$, $m_k$ representing the mass of hydraulic medium in the channel 6 or channels 6, and $A_z$ and $A_k$ representing the cross-sections of the interior of the cylinder 4 and of the channel 6 or channels 6. The resonant frequency $f_o$ of the damper arrangement is proportional to $(1/m_w)^{\frac{1}{2}}$.

A variation of the cross-section of the channel 6 or channels 6 usually brings about a considerable variation of the particular active throttle resistance, since the flow resistance in a channel depends appreciably on the cross-section and on the flow velocity.

When the relative movements between the steering 3 and the vehicle body 2 are slow, the damping can largely be ignored because the piston 5 can follow the slow movements of the steering 3 virtually without any phase shift. In particular, during the slow movements which occur, only a very slight hydraulic resistance acts on the piston 5 within the cylinder 4, and therefore, the helical spring 9 also experiences virtually no deformation.

In response to more rapid movements of the steering 3, especially rapid vibrations, the piston 5 is excited into vibrations, and at the same time vibrations of the hydraulic medium in the channel 6 or channels 6 occur. The nearer the frequency of the vibrations of the steering 3 approaches the resonant frequency of the damper arrangement 1, the higher the vibration amplitudes of the piston 5 and the flow velocities of the hydraulic medium in the channel 6 or channels 6 become. The energy necessary for exciting the vibrations of the piston 5 and of the hydraulic medium in the channel 6 o channels 6 is extracted from the kinetic energy of the steering 3, that is to say the vibrations of the steering 3 are attenuated correspondingly. At the same time, as a result of the flow resistance clearly active at higher flow velocities, the kinetic energy of the piston 5 and of the hydraulic medium within the channel 6 or channels 6 is constantly converted into heat, i.e., an appreciable dissipation of energy takes place.

In the supercritical range, i.e., at vibrations of which the frequency of the damper arrangement, the steering 3 and the vehicle body 2 are vibrationally uncoupled from one another, with the result that virtually no acoustic vibrations can be transmitted.

The following factors, among other things, must be taken into account in the coordination of the damper arrangement according to the present invention. If the channel 6 or channels 6 have a large cross-section and/or the channel inlets and outlets are of such streamlined shape that only a slight turbulence of the hydraulic medium occurs then, vibrations of the piston 5 in the cylinder 4 or of the hydraulic medium in the channel 6 or channels 6 experience only a comparatively low damping, that is to say the damper arrangement 1 exhibits an especially pronounced resonant behavior. This is equivalent to saying that, at vibrations near the resonant frequency of the damper arrangement 1, large amount of kinetic energy are extracted from the steering 3, whereas at frequencies at some distance from the resonant frequency a comparatively small amount of kinetic energy is transmitted from the steering 3 to the damper arrangement 1 and nullified there by the dissipation of energy, namely converted into heat. In contrast, in a narrow-band frequency range in the neighborhood of the resonant frequency of the damper arrangement, the steering 3 can transfer an especially large amount of kinetic energy to the damper arrangement 1.

With large cross-sections of the channel 6 or channels 6 or with the streamlined shape of the channel inlets and outlets, therefore, there is a narrow-band therefore, there is a narrow-band damping of vibrations of the steering 3 with a strongly pronounced maximum amount of energy transmitted from the steering 3 to the damper arrangement 1.

In contrast, if the channel 6 or channels 6 have a narrower cross-section and/or the channel inlet and outlets are so configured (for example, with platelets or with an angular shape) that a pronounced turbulence of the hydraulic medium takes place, vibrations of the piston 5 and of the hydraulic medium in the channel 6 or channels 6 are damped to a greater extent, with the result that lower vibration amplitudes occur when the resonant frequency is excited. Correspondingly, the energy dissipation possible when resonant vibrations occur is also lower; but the possible dissipation of energy during vibrations at a frequency differing to a greater or less extent from the resonant frequency decreases less sharply. Accordingly, kinetic energy can be transferred effectively to the damper arrangement 1 from the steering 3 within a comparatively wide frequency band and nullified there as a result of energy dissipation. In contrast, the maximum possible transmission of kinetic energy from the steering 3 to the damper arrangement 1 is less pronounced.

As regards the flow resistance or throttle resistance of the channel 6 or channels 6, it must be remembered that, for the same total cross-sections, a plurality of channels 6 arranged in parallel has a higher resistance than a single channel 6, because the throttle or flow resistance than a single channel 6, because the throttle or flow resistance increases super proportionally with a decreasing cross-section of a channel. Thus, a varying flow resistance or throttle resistance can be obtained with the same effective masses of the hydraulic medium received in the channels 6. Moreover, the throttle or flow resistance of a channel 6 also changes with its length, the resistance increasing approximately in proportion to the length.

To make it possible to obtain a desired channel length even when the piston 5 is short in the axial direction, the channel 6 or channels 6 are arranged, for example, helically or the like. Furthermore, there is a possibility, where appropriate, of extending the channel 6 or channels 6 beyond the piston and faces by tubular connection pieces.

In order to prevent abrupt changes of the flow velocity of the hydraulic medium and cavitation (the occurrence of vapor bubbles in the hydraulic medium as a result of a locally very low pressure) at the open ends of the channel 6 or channels 6 during the shifting of the piston 5 in relation to the cylinder 4, the ends of the channel 6 or channels 6 can be widened in a trumpet-shaped manner.

In contrast to the embodiment illustrated, the channel 6 or channels 6 can also be configured as bypass channels which are located in the cylinder and which connect the chambers 4' and 4'' to one another outside the range of movement of the piston 5, so that a piston 5 without any perforations can be provided.

It is possible, moreover, to arrange the helical spring 9 on the piston rod 7 outside the cylinder 4. Furthermore, especially in this alternative embodiment with a spring 9 arranged outside the cylinder 4 ca be arranged on both sides of the piston 5, so that the effective surfaces of the piston 5 which confront the respective chambers 4' and 4'' are of the same size. In an embodiment of this type, the compressed-gas charge 8 can be omitted or can be made substantially smaller, so that it essentially only makes it possible to compensate the changes in volume of the hydraulic medium as a result of temperature changes.

Moreover, it is also possible to connect the cylinder 4 to the steering linkage 3 (i.e., small mass m) and the piston rod 7 to the body 2 (i.e., large mass M).

Furthermore, in principle, both chambers 4' and 4'' together with the compressed-gas charge 8 can also be arranged on one side of the piston 5, in which case a partition fixed to the cylinder and having the channel 6 or channels 6 is arranged between the chambers 4' and 4''.

In summary, it can be stated that the damper arrangement 1 according to the present invention operates with pronounced frequency selectively, in that only during movements or vibrations within a frequency band predetermined by the construction or dimensioning of the damper arrangement 1 can the element be damped in terms of its movement (the steering 3 in the illustrated embodiment) transmit kinetic energy to a relatively great extent to the damper arrangement 1 and thus excite the piston 5 and the hydraulic medium in the channel 6 or channels 6 into vibrations. In this case, the energy of the excited vibrations is nullified (converted into heat and eliminated outwards) as a result of the dissipation of energy, i.e., by turbulence at the channel inlets and outlets and by the friction of the hydraulic medium in the channel 6 or channels 6.

If the damper arrangement 1 is coordinated appropriately, therefore, it takes effect only during critical states of movement or vibration of the steering 3 or of the element to be damped in terms of its movement. Moreover, the influence of the damper arrangement can be more or less ignored.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A hydraulic damper with a hydraulic positive-displacement unit insertable between an element to be danmped in terms of its movement and a relatively stationary element, comprising a cylinder housing, a piston movably arranged in the cylinder housing so as to define only two fluid chambers in the housing, said chambers being connected to one another, via at least one throttle effect channel in the piston, between which hydraulic medium is exchanged via the at least one channel during movement of the piston, one of the piston and the housing is a part vibrationally connected, via an elastic spring mounting arranged in series and axially therewith, to the damped element, the spring constant of the spring mounting, the mass of the part vibrationally connected to the spring mounting, the mass of the hydraulic medium moved during the relative axial movements between the piston and the cylinder housing, and the ratio between the cross-section of the at least one channel and the effective cross-section of the piston being sized such that the resonant frequency of vibrations of the masses in relation to the stationary part if near the frequency range of undesirable vibrations of the damped element, and the at least one channel has a throttle resistance increasing sharply with the flow velocity to provide high energy dissipation and thereby extract a substantial amount of kinetic energy from the element to be damped.

2. The damper according to claim, wherein the piston is arranged in series with the spring mounting.

3. The damper according to claim, wherein chambers filled with hydraulic medium are arranged on both sides of the piston and are connected to one another via the at least one channel 4. The damper according to claim 3, wherein the piston is arranged in series with the spring mounting.

5. The damper according to claim 3, wherein the at least one channel is arranged in the piston.

6. The damper according to claim 5, wherein the piston is arranged in series with the spring mounting.

7. The damper according to claim 1, wherein a steering-linkage part of a vehicle steering is connected to one of the housing and the piston via the spring mounting, and the vehicle chassis is connected to the other of the housing and the piston.

8. The damper according to claim 7, wherein the piston is arranged in series with the spring mounting.

9. The damper according to claim 8, wherein chambers filled with hydraulic medium are arranged on both sides of the piston and are connected to one another via the at least one channel.

10. The damper according to claim 9, wherein the at least one channel is arranged in the piston.

* * * * *